United States Patent
Heiner et al.

(10) Patent No.: US 7,711,571 B2
(45) Date of Patent: May 4, 2010

(54) DYNAMIC CONTEXT-SENSITIVE TRANSLATION DICTIONARY FOR MOBILE PHONES

(75) Inventors: Andreas Heiner, Espoo (FI); Harry Boer, Helsinki (FI)

(73) Assignee: Nokia Corporation, Espoo (FI)

( * ) Notice: Subject to any disclaimer, the term of this patent is extended or adjusted under 35 U.S.C. 154(b) by 1177 days.

(21) Appl. No.: 10/802,531

(22) Filed: Mar. 15, 2004

(65) Prior Publication Data

US 2005/0203727 A1 Sep. 15, 2005

(51) Int. Cl.
*G10L 21/00* (2006.01)
(52) U.S. Cl. .................... 704/277; 704/270; 704/9; 704/1
(58) Field of Classification Search .......... 704/277, 704/270, 9, 1
See application file for complete search history.

(56) References Cited

U.S. PATENT DOCUMENTS

| | | | |
|---|---|---|---|
| 5,551,055 A | 8/1996 | Matheny et al. | |
| 6,266,642 B1 * | 7/2001 | Franz et al. | 704/277 |
| 7,272,377 B2 * | 9/2007 | Cox et al. | 455/403 |
| 2003/0065504 A1 * | 4/2003 | Kraemer et al. | 704/8 |
| 2004/0167770 A1 * | 8/2004 | Zhuo et al. | 704/4 |

OTHER PUBLICATIONS

"Location-Based Services", V. Bennett et al, IBM developerWorks, Mar. 1, 2002, from the Internet.

* cited by examiner

*Primary Examiner*—Qi Han
(74) *Attorney, Agent, or Firm*—Ditthavong Mori & Steiner, P.C.

(57) ABSTRACT

A method and apparatus are presented for providing language translation assistance to a user of a mobile terminal. The terminal makes available a number of language translation services to the user, and the mobile terminal has a database for storing translation data. If the translation data is insufficient to cover a present or anticipated context of the mobile terminal, then the terminal sends a context change signal, and subsequently receives a data update signal that includes updates to the database. The terminal is then able to provide a changed language translation service to the user, utilizing the updates to the database.

28 Claims, 2 Drawing Sheets

DYNAMIC CONTEXT-SENSITIVE TRANSLATION DICTIONARY FOR MOBILE PHONES

FIELD OF THE INVENTION

The present invention relates to dictionaries and electronic devices for translating from one language to another.

BACKGROUND OF THE INVENTION

Before visiting a country where a foreign language is spoken, a person in the twentieth century would normally try to learn some of the language in advance of the visit, and would also bring written material such as a dictionary to assist the person to translate from one language to another. For example, the Berlitz Company provided such written materials beginning in 1878.

With the advent of new technology in the late twentieth century, language translation became more intertwined with electronic devices. Today, for example, the internet provides many free translation services, such as the "language tools" at www.google.com. Also, many electronic devices can be programmed for similar translation purposes, including devices known as personal digital assistants (PDAs).

Thus, when a person has gone on holiday to a foreign country, the classical approach to using the local language has been a phrase book, but more recently PDA language-modules or translation computers/devices have become available. The flexibility of these approaches is limited, for several reasons. First, one has to know which countries one is visiting, which may not necessarily be the case for business travelers. Second, phrases for all possible occasions are stored, even for occasions or situations that are unlikely to occur. Third, phrases in one version of a language can mean something completely different in another language (e.g. English-UK versus English-US).

It is known to update an application in order to conform with unique requirements of a specific locale, including updates involving language translation. See Matheny et al. (U.S. Pat. No. 5,551,055). However, such methods and devices have been directed toward providing a user interface that is translated to match the user's language preference, rather than for enabling the user to communicate with people who speak a different language from the user. Thus, no solution has been presented for efficiently updating a language translation tool based upon context (e.g. environment).

There is a service for downloading e-books to mobile phones, provided by a company called Eweline. See http://www.eweline.com/ewel.asp?viewID=1519. For example, Eweline Finland has launched a new service for offering even law books to mobile phone users. Downloading the content would occur based on user requests, so that the service does not choke up the mobile phone with the information. One possibility, in addition to providing law books, would be to offer different kinds of instruction manuals, construction drawings, et cetera, and dictionaries might be one kind of manual. However, the Eweline service offers no context-sensitivity, and therefore does not solve the problem described above regarding how to efficiently update a language translation device based upon context (e.g. environment).

SUMMARY OF THE INVENTION

A dictionary of words and/or phrases for the local language, relative to a traveler's personal language, is loaded to the traveler's handheld device depending on the location where the traveler is situated. This offers a greater dynamic, personalized, and area-specific solution. The handheld device will then provide translation assistance without necessarily having a wireless or wireline connection to any other device or network.

There are many location-based services available nowadays, and it is already possible to download information about local restaurants, traffic jams, weather, et cetera. Some of these types of information are automatically sent (e.g. traffic alerts), as is also true of the present invention. However, none of the existing services presents the idea of location-based transmission of a translation dictionary for the local language, based on the mobile phone's respective location.

An embodiment of the present invention thus automatically loads a customized translation dictionary to the handset (e.g. a mobile phone or other electronic device) depending on the situation or environment. The invention improves upon earlier solutions because, for example, books cannot include the latest colloquial phrases, and moreover books are physical entities that require mass production. For uncommon language combinations (e.g. Dutch-Finnish), useful dictionaries are not present due to weak demand that has not reached a critical mass necessary for mass production. Books also cannot cope with written material such as pictograms, which may have different meanings in different cultures. Moreover, the present dictionary can be personalized and contain more detailed information, because the same storage includes sub-domains of all possible environments (e.g. hotel, airport, hospital, restaurant). Also, the present dictionary can adapt easily to a new environment, for example when a person moves from a discussion of ice hockey to a discussion of cross country skiing.

According to an embodiment of the present invention, a context-sensitive dictionary is driven by voice, characters, images, and/or sensory information to select a suitable subset of phrases in a specific language, and this subset is loaded in the handset. An expected environment (e.g. a museum trip today, a beach trip tomorrow) can also be loaded. Irrelevant phrases (e.g. related to yesterday's safari) can be removed. The full phrase dictionary can be implemented using a centralized server, in conjunction with a person's home operator. Translations can be made indirectly via other languages. The correct dictionary context can be voice-selected, or controlled by any other means deemed suitable (e.g. if a high temperature is detected then phrases such as "please turn down the thermostat" might be loaded). One may also have speech recognition and synthesis as input and output modes, respectively, although that would require a continuous wireless connection (because the processing capacity of the mobile device alone would be insufficient). As an extension to this idea, one can record phrases to later have them translated into the language of whatever country one visits (e.g. phrases like "please help me find a pharmacy").

Implementation alternatives include a centralized server with all possible phrases for all possible cases. The relevant translation dictionary or subset thereof can be user-requested, or triggered by personal preference settings, or be triggered by the environment (pizzeria, time of day, et cetera). Input modes may be by voice, camera, typed, or any other means deemed suitable. The present invention may also use other sensory information (e.g. there would be no use loading phrases or jargon related to skating if it is 90° C.). The present invention may incorporate features of pronunciation instruction, as well as text-to-speech features, among the other language translation services described above.

DETAILED DESCRIPTION OF THE PREFERRED EMBODIMENTS

Figure 1:
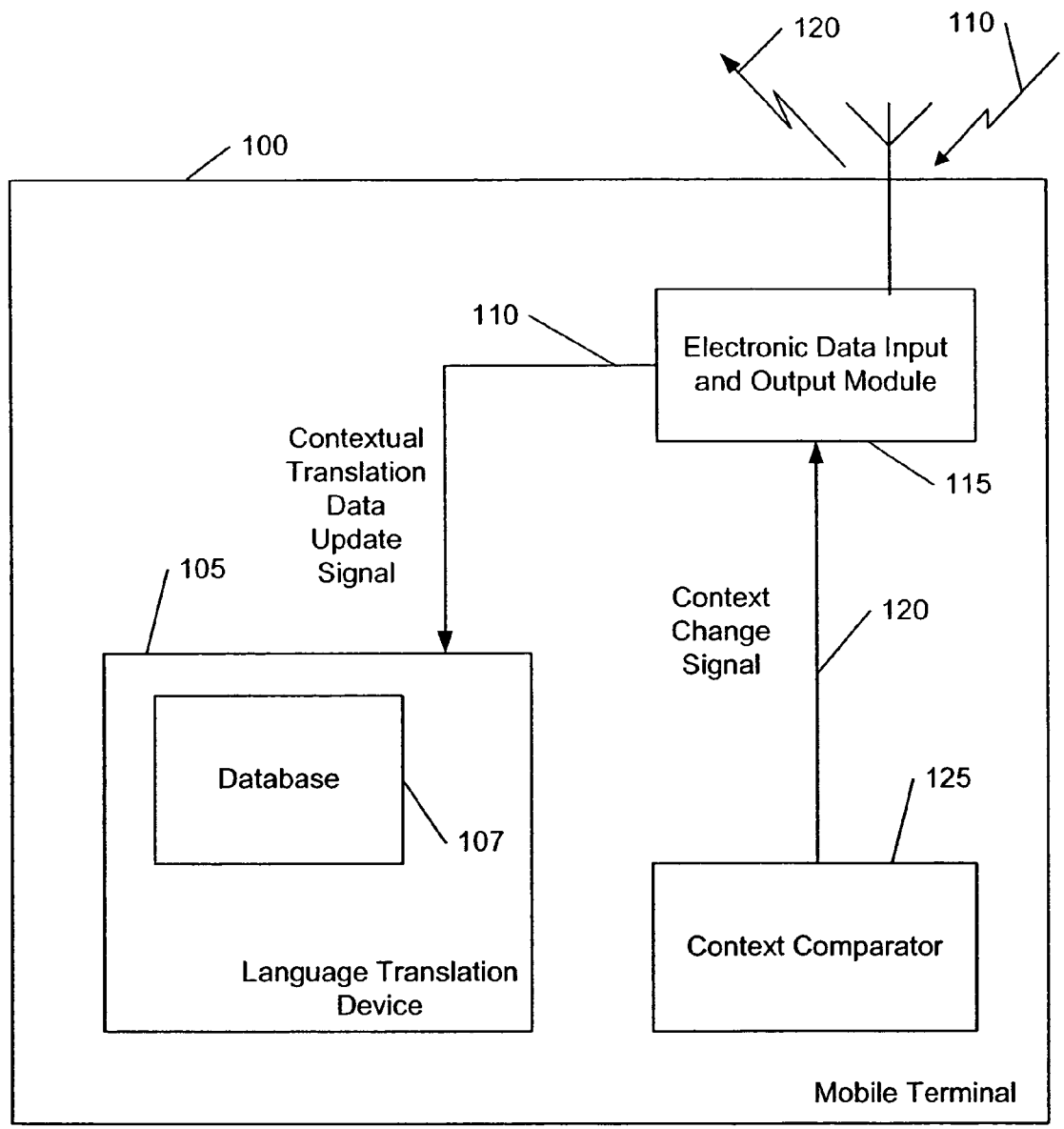
FIG. 1 is a block diagram showing a mobile terminal according to an embodiment of the present invention.

The present invention can be more fully appreciated by reference to the figures. FIG. 1 shows a mobile terminal 100 according to a preferred embodiment of the invention. This mobile terminal is for providing language translation assistance to a user. The mobile terminal may be a wireless device as shown in FIG. 1, in which case the electronic data input and output module 115 would be a transceiver. However, the mobile terminal could alternatively be some other sort of electronic device, such as an accessory that can be attached to and be detached from a wireless telephone.

In any event, the terminal 100 comprises a language translation device 105 that includes a database 107 having translation data. This language translation device 105 is equipped to provide a number of language translation services to the user, and the language translation device 105 is responsive to a contextual translation data update signal 110 that updates the database 107 when the context of the mobile terminal changes in such a way that the data in the database is no longer sufficient. For example, the number of language translation services provided by the mobile terminal 100 may be zero, if the user is arriving from the user's home country, and so there would initially be no translation data in the database 107 at all. The update signal 110 would then provide that translation data, and would subsequently update the data as the user moves from one foreign country to another, or even within a foreign country from one setting or location to another.

The terminal 100 further includes the electronic data input and output module 115, which is for providing the data update signal 110 that originates from outside the mobile terminal. The data update signal 110 is provided to the mobile terminal in response to a context change signal 120 that indicates the database needs to be updated. The context change signal may include, or be accompanied by, an indication of a translation need or desire of the user. That indication may identify a language in which the user is fluent, or may identify a particular word or phrase that the user may need to have translated.

The context change signal 120 is provided by a context comparator 125 within the mobile terminal 100. A purpose of this context comparator 125 is for providing the context change signal 120, if the translation data in the database 107 is insufficient to cover a present or anticipated context of the mobile terminal.

The mobile terminal 100 is configured to provide language translation without generally requiring support from any language translation resource external to the mobile terminal, except of course when the signals 110 and 120 are being used to update the mobile terminal's database 107. However, outside support could be accessed if and when the mobile terminal is unable to perform a desired translation.

If the mobile terminal is taken across (or is near) an international border, then the context comparator 125 will detect from the network that a different country has been (or may soon be) entered, and the context comparator will check the database 107 to see if the database has sufficient data to provide translation in the new country; if not, then the context change signal 120 is sent. Likewise, the context comparator 125 may be able to also detect its specific context within a country (e.g. by sending coordinates in order for the network to describe the specific context, or by the user inputting the specific context, or by hearing keywords indicative of context), and the context comparator 125 will then check the database 107 to see if the database has sufficient data to provide adequate translation in the new context; if not, then the context change signal 120 is sent. Another possibility is for the context comparator 125 to deduce that the translation data in the database 107 is insufficient to cover the present context if the mobile terminal is unable to translate a word or words, in which case the context change signal 120 will be sent, and then the network can determine the new context (from those words) and accordingly provide the data update signal 110 so that the user can translate not just those words, but also other words and phrases that occur in the same (or a similar) context.

Figure 2:
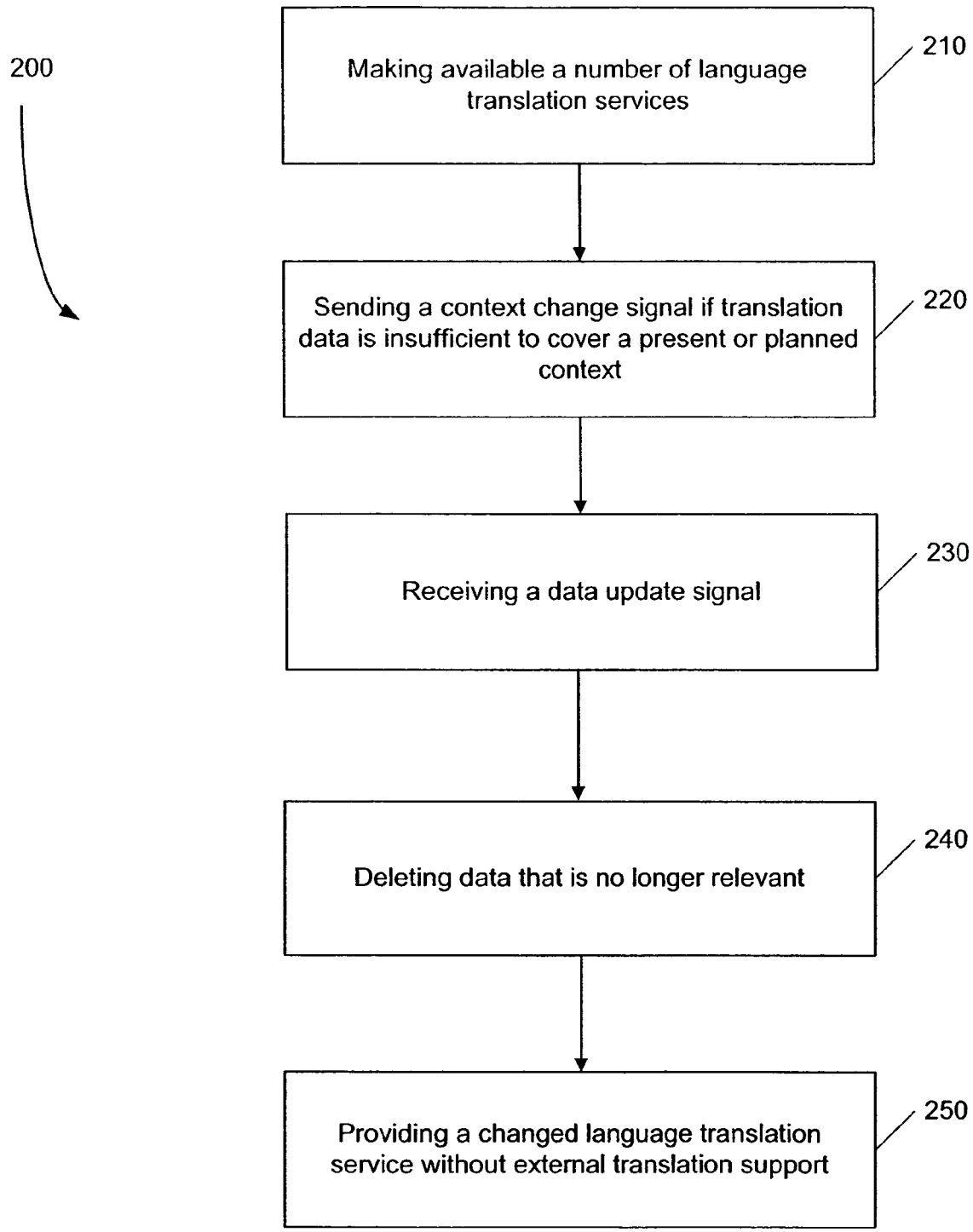
FIG. 2 is a flow chart showing a method according to an embodiment of the present invention.

Referring now to FIG. 2, this flow chart shows a method 200 according to an embodiment of the present invention. Initially, a number of language translation services are made available 210 to the user. As mentioned previously, this number of services may initially be zero if the user is located in his or her home country, or the number of services can initially be greater than zero if the user is travelling in a locale where he or she is not fluent with the local language. Even if the user is in his or her home country, it may be desirable for the user to have access to some minimal translation services, instead of zero services. In any event, the next step is sending 220 a context change signal, if translation data is insufficient to cover a present or planned context, as discussed in the previous paragraph above. Merely changing a context (e.g. going from a bowling alley to an art museum) may not require additional translating capability if the user already has sufficient translation data available. However, if not enough translation data is available, then the step 220 is necessary, and that step is followed by receiving 230 the data update signal containing the needed translation data. It may also then be possible to delete 240 some data that is no longer relevant. For example, if an American is travelling in France, and then goes to Germany, then the French translation data can be deleted, while the German translation data is added. Finally, the user is provided 250 with a changed language translation service, which of course will be changed for the better, and will not necessarily require any external translation support. In other words, the mobile terminal should usually provide 250 the user with all the translating capability that the user needs, in a stand-alone fashion, without needing to further access any internet translation sites or other external resources.

It is to be understood that all of the present figures, and the accompanying narrative discussions of preferred embodiments, do not purport to be completely rigorous treatments of the invention under consideration. A person skilled in the art will realize that the structures described in this application can be implemented by a variety of different combinations of materials and in a variety of ways, without departing from the spirit of the invention, and likewise the method described herein can be implemented by various different combinations of hardware and software (e.g. computer readable medium encoded with a software data structure for performing the method), and in various different sequences, which need not be further detailed herein.

What is claimed is:

1. A method comprising:

causing, at least in part, making available a number of language translation services to a user of an apparatus that has a database for storing translation data, causing, at least in part, sending a context change signal if the translation data is insufficient to cover a present or anticipated context of the apparatus, causing, at least in part, receiving a contextual translation data update signal that includes updates to the database, and providing at least one changed language translation service to the user, utilizing the updates to the database, wherein the present or anticipated context is a setting within a country, said country having a primary language different from another language in which the user is fluent, and wherein said updates include adding to the database a selected subset of phrases that are suitable for said setting within said country, and removing from the database another selected subset of phrases that are irrelevant to said setting, and said setting includes a temperature.

2. The method of claim 1, wherein said subset of phrases relates to sports or a point-of-interest.

3. The method of claim 1, wherein said subset of phrases is selected from a group comprising phrases for a hotel, airport, hospital, and restaurant.

4. The method of claim 3, wherein the anticipated context is entered by the user.

5. The method of claim 3, wherein the setting is sensed by, determined by, or signaled to the apparatus.

6. The method of claim 1, wherein parts of said translation data in said primary language that are irrelevant to the present or anticipated context are deleted, and the selected subset of phrases in said primary language is added.

7. The method of claim 1, wherein the apparatus provides the language translation assistance, after the receiving step, without requiring support from any language translation resource external to the apparatus.

8. The method of claim 1, wherein the at least one language translation service includes speech recognition and synthesis, as input and output modes respectively.

9. The method of claim 1, wherein the context change signal includes, or is accompanied by, an indication of at least one translation need or desire of the user.

10. The method of claim 1, wherein said updates include the latest colloquial phrases that are suitable for said setting.

11. The method of claim 1, wherein the database is a translation dictionary, and said setting further includes a date or a time of day.

12. The method of claim 1, wherein the number of language translation services is zero if the user is in, a country where the user speaks fluently.

13. The method of claim 1, wherein the at least one language translation service includes pronunciation instruction or at least one text-to-speech feature or both.

14. The method of claim 1, wherein the apparatus is a mobile terminal.

15. An apparatus comprising:

a language translation device that includes a database configured to accommodate translation data, the language translation device being equipped to provide a number of language translation services to a user, and the language translation device being responsive to a contextual translation data update signal that updates the database;

an electronic data input and output module, configured to provide the contextual translation data update signal to the language translation device, the electronic data input and output module being responsive to a context change signal indicative that the database may need to be updated; and a context comparator configured to provide the context change signal if the translation data is insufficient to cover a present or anticipated context of the apparatus, wherein the contextual translation data update signal is input into the apparatus, and the context change signal is output from the apparatus, wherein the present or anticipated context is a setting in a country having a primary language different from a language in which the user is fluent, and wherein said updates include adding to the database a selected subset of phrases that are suitable for said setting, and removing from the database another selected subset of phrases that are irrelevant to said setting, and said setting includes a temperature.

16. The apparatus of claim 15, wherein said subset of phrases relates to sports or a point-of-interest.

17. The apparatus of claim 15, wherein said subset of phrases is selected from a group comprising phrases for a hotel, airport, hospital, and restaurant.

18. The apparatus of claim 17, wherein the anticipated context is entered by the user.

19. The apparatus of claim 17, wherein the setting is sensed by, determined by, or signaled to the apparatus.

20. The apparatus of claim 15, further configured to handle parts of said translation data in said primary language that are irrelevant to the present or anticipated context, by deleting said parts, and the selected subset of phrases in said primary language is added.

21. The apparatus of claim 15, wherein the apparatus is configured to provide the language translation assistance, after the update signal updates the database, without requiring support from any language translation resource external to the apparatus.

22. The apparatus of claim 15, wherein the at least one language translation service includes speech recognition and synthesis, as input and output modes respectively.

23. The apparatus of claim 15, wherein the context change signal includes, or is accompanied by, an indication of at least one translation need or desire of the user.

24. The apparatus of claim 23, wherein said updates include the latest colloquial phrases that are suitable for said setting.

25. The apparatus of claim 23, wherein the database is a translation dictionary, and said setting further includes a date or a time of day.

26. The apparatus of claim 15, wherein said subset of phrases relates to sports or a point-of-interest.

27. The apparatus of claim 15, wherein the at least one language translation service includes pronunciation instruction or at least one text-to-speech feature or both.

28. A computer readable storage medium encoded with software when executed causing, at least in part, an apparatus to perform the following steps:

making available a number of language translation services to a user of an apparatus that has a database for storing translation data, sending a context change signal if the translation data is insufficient to cover a present or anticipated context of the apparatus, receiving a contextual translation data update signal that includes updates to the database, and providing at least one changed language translation service to the user, utilizing the updates to the database, wherein the present or anticipated context is a setting within a country, said country having a primary language different from another language in which the user is fluent, and wherein said updates include adding to the database a selected subset of phrases that are suitable for said setting within said country, and removing from the database another selected subset of phrases that are irrelevant to said setting, and said setting includes a temperature.

* * * * *